United States Patent [19]

Furga

[11] 4,392,257
[45] Jul. 12, 1983

[54] METHOD OF MAKING DRESSES FOR DOLLS AND THE LIKE AND PRODUCT OBTAINED BY THIS METHOD

[76] Inventor: Giulio S. Furga, Via Fatebenefratelli 12, Milan, Italy

[21] Appl. No.: 82,213

[22] Filed: Oct. 4, 1979

[51] Int. Cl.³ .................... A41D 1/22; B32B 33/00
[52] U.S. Cl. ........................................ 2/105; 156/251
[58] Field of Search .................. 156/251; 2/105, 87, 2/49, 243

[56] References Cited

U.S. PATENT DOCUMENTS

| | | | |
|---|---|---|---|
| 2,688,136 | 9/1954 | Freedman | 2/105 |
| 3,323,136 | 6/1967 | Beck | 2/87 |
| 4,137,114 | 1/1979 | Ours | 2/87 |

*Primary Examiner*—Doris L. Troutman
*Attorney, Agent, or Firm*—Browdy and Neimark

[57] ABSTRACT

A method of making dresses for dolls or the like, comprising: superposing to each other two strips of synthetic fabric of a kind capable of being welded; repeatedly performing thereafter, all along the development of said fabric strips, electronic welds or the like in the form of dotted or dashed weld lines in order to obtain joining together of said strips in proximity of the boundaries of the individual doll dresses which are to be obtained so that sewn seams are simulated; causing the so welded garments to be cut all along their boundary line leaving a slight margin outside the weld line to simulate the margin of a sewn seam and, finally, turning each single dress inside out so that the faces of the fabric strips which had initially been made to adhere to each other, are now outwardly directed.

7 Claims, 4 Drawing Figures

METHOD OF MAKING DRESSES FOR DOLLS AND THE LIKE AND PRODUCT OBTAINED BY THIS METHOD

FIELD OF THE INVENTION

This invention relates to a method of making dresses for dolls, puppets and the like. The invention also relates to a product obtained by said method.

BACKGROUND OF THE INVENTION

As is known, in industrially made dolls, the clothing has become increasingly important by becoming more and more elaborate and handsome as regards both its fashion and the fabric quality, to such an extent that it is usually the dress—i.e. the first object of attention for a potential buyer—which classifies and features a product in this trade.

DESCRIPTION OF THE PRIOR ART

Present-day doll dresses are made by the same conventional systems as employed for manufacturing individuals' clothing. In fact, in order to make doll dresses first the so-called "lay" has to be formed, which consists in several superposed fabric layers, whereupon the cutting operation is performed, this being made by using suitable hand-knives or cutters that are manually operated to follow a preestablished tracing, or by having recourse to a punching operation utilizing appropriate blanking tools.

After cutting, the parts of the garments have to be sewn together, by an operation that is made on a single garment at a time utilizing sewing machines conducted by experienced workers.

Thereafter, a finishing operation is performed on each doll dress and this consists in providing the garments, by having recourse to other kinds of machines, with a wide variety of clothing requisites (collars, blouses to be combined with the skirts, edging, bordering, ribbons, laces, bets, embroideries, various kinds of ornaments, buttonholes, buttons, hooks and the like).

Such a known method of making dresses for dolls or the like is very expensive, above all since it involves a great deal of labor and also in consideration of the large number of special machines that are required to be available therefor.

Moreover, the small sizes of the garments to be made do not allow taking full advantage of the productive capacities of the employed machines.

Thus, for instance, the seams sewn in said garments are so small in length that the sewing machines are not able, in general, to develop their attainable working speeds, so that the outputs of these machines will be considerably reduced.

As a matter of fact, it is realized that, in the business economy, the cost of the doll dress alone will, on an average, attain 50% of the prime cost of the finished garment as a whole, said prime cost being intended as the cost of the employed materials together with the cost of the manual labor. In other words, in a doll, the bosom, the limbs, the head provided with make-up and hairdressing with hair capable of being combed, the movable opening-and-closing eyes, the shoes and socks, the assembling of all these components, the doll clothing and dressing operation, as well as the handsome packing and presentation case, do not involve, in most cases, a cost higher than that of the said dress alone, when this latter is obtained by the above mentioned conventional method.

SUMMARY OF THE INVENTION

The main object of this invention is to provide a novel method of making doll dresses which permits high production rates to be obtained with extremely reduced employment of manual labor and complete suppression of use of sewing machines, so as to substantially reduce the cost of said dresses while assuring a full satisfactory degree of finish for a high quality end product.

The above and other objects of the invention, which will appear later, are attained by the method of making dresses for dolls or the like according to said invention, which method comprises: superposing to one another two strips of synthetic fabric, of a kind which is capable of being welded; repeatedly performing thereafter, on the entire development of said fabric strips electronic welds or the like, capable of causing said strips to join together along linear regions at or near the contour or boundaries of each single doll garment to be obtained; performing the cutting out of said garments all along their boundaries; and finally turning each single item of clothing inside out, so as to cause the fabric faces that were initially adhering to one another, to be now outwardly directed.

With advantage, the above electronic welds are performed along dashed or dotted lines, so that the sewn seams are imitated.

According to a further feature of the invention, said fabric strips can be prepared, before being joined together, in such a manner as to have their surfaces provided with figured designs, tracing, wordings or the like, pertaining to various clothing requisites such as collars, belts, pockets, ornaments, cuffs or other similar finishing elements.

In this manner, doll dresses already all-finished with any clothing requisites and being wholly comparable to garments obtained by conventional methods utilizing sewing and other special machines, can be made at high production rates and with a minimum labor involved.

The above and further features and advantages of the invention will be better understood when considering the following description of a preferred but not exclusive embodiment thereof, which is shown in the accompanying drawing, being both the description and the drawing given as a non-restrictive example.

DESCRIPTION OF THE PREFERRED EMBODIMENT FORM

Figure 1:
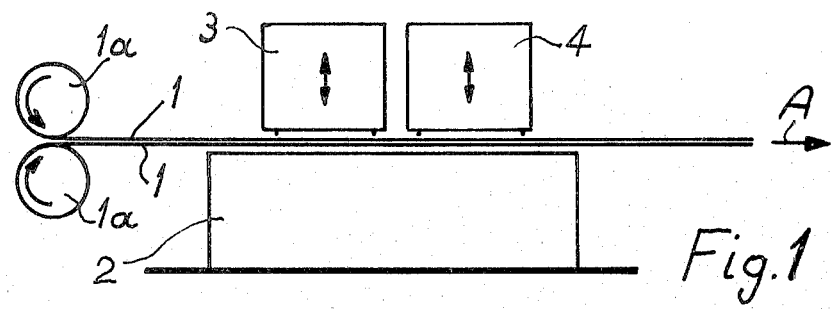
FIG. 1 is a diagram showing the apparatus for carrying into practice the method of making doll dresses according to the invention.
Figure 2:
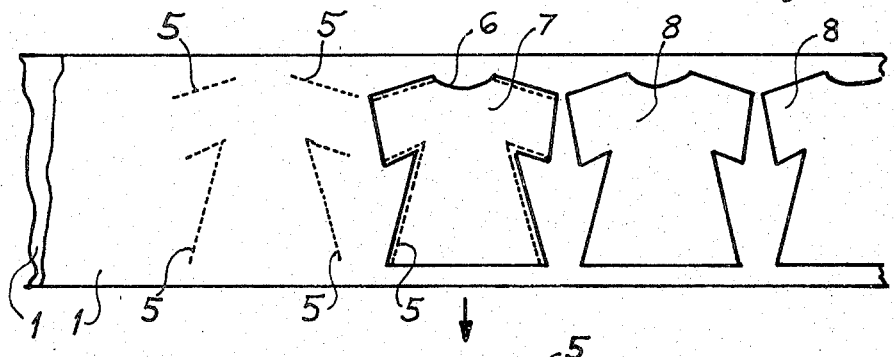
FIG. 2 is a diagrammatic view showing the different steps of the method according to the invention.

Referring now to the above figures and particularly to FIGS. 1 and 2, the method according to the invention provides for the laying upon one another of two strips 1 of a synthetic type fabric which is capable of being welded. Thus, for instance, fabrics made of acrylic, nylon, polyester and other resin based yarns may be used, according to the properties that are to be obtained in the finished product, as regards appearance, handle, behavior to washing, wear, and so on.

The strips 1 may be taken off from respective rolls 1a, then made to superpose on one another and to advance together on a table 2 (FIG. 1) in the direction which is shown by the arrow A. Above said table 2, two stations 3 and 4 are provided, and namely, an electronic welding station and a punching or cutting station respectively, feeding means (not shown) being provided to cause said strips 1 to be intermittently moved, with a constant step, in order to correspond in position with said stations.

The station 3 is equipped with an electronic, high frequency welding apparatus (known per se), which is so designed as to perform a succession of weld lines 5 (FIG. 2), said lines preferably comprised of discontinuous or dashed lines with a view to imitate the stitches of sewn seams. These weld lines are provided near the boundaries of the doll garment which is to be obtained, in lieu of the conventional seams made by thread. The welding apparatus is alternatively moved downward and upward in order to produce, at each down stroke, a complete set of welds 5 pertaining to one doll dress, while at the end of each upward stroke, the strips 1 are made to advance together by a step, so as to bring the now made welds correctly below the punching or cutting station A.

This latter station is equipped with cutting or blanking tools (known per se) which alternatively move up and down, the same as the welding apparatus does, in order to perform, at each down stroke a cut 6 all along the boundaries of a doll garment, being this latter, as indicated in 7, FIG. 2, completely cut out of and separated from, the strips 1. Of course, the cut 6 is made along a line being slightly outwardly spaced from the weld lines 5.

According to a modification of the above embodiment, instead of being made to occur in successive steps, the welding and cutting operations may take place in a single step, and this by either combining together, on a single support, the welding elements and the cutting blades, or by providing for the welding elements to directly cause the punching action themselves, while welding is being performed. Obviously, this latter solution will only be possible if a fabric having suitable properties is used.

After separation of the cut-out dresses 7, the remaining portion of the strips 1 (which now have openings 8 therein where the garments have been punched off) will continue its way towards a waste collecting station, while each dress is turned inside out so that it reaches the disposition indicated by 9, FIG. 2, for which disposition the fabric faces that were initially made to adhere against one another, are now outwardly directed, in a manner similar to that which occurs when garment parts are sewn together by thread.

After turning inside out, the dresses 9 can be either immediately utilized for clothing the dolls, or they can be conveyed up to a special workshop where the garments receive clothing requisites thereon, such as pockets, collars and the like which may themselves be applied on the garments by an automatic system making use of electronic welding.

Of course, the welding and cutting devices may be arranged for simultaneously working two or more garments at a time so that a very high production rate is obtained.

According to a further improvement of the invention, provision is made, moreover, to have the fabric strips 1—before their being put together—figured with designs and tracing with the object of delineating, for instance, a collar, a belt, a pocket, ornaments and similar clothing requisites on said strips. These designs and tracings may be produced either by printing them on the fabric using the silk screen system or any other suitable printing system, or by directly weaving said designs and tracings into the fabric by utilizing, for instance, weaving machines of the Jacquard type. It is thus possible to pre-establish or produce beforehand patterns, particulars, ornaments, wordings or whatever other clothing requisites there may be and, of course, some given designs or patterns will be provided which are pertaining to the front of the garment, and some other ones which are pertaining to the back thereof (thus, for instance, pockets may be provided on the front, which are absent on the back).

The fabrics having the ornaments and clothing requisites (printed on the fabric, or woven into the latter by Jacquard machines) are than put together so as to bring their figured surfaces in adhering relationship, with the patterns on the two strips 1 made to exactly coincide with one another (there may also be provided automatic controlling and adjusting devices of the photoelectric cell type, for this purpose).

The manufacturing process proceeds then in a manner similar to that described above, until turning inside out of the garments is made also in the manner already stated.

Thus, various styles of doll dresses can be achieved, all of which are provided with whatever clothing requisites and ornamental trimming or patterns there may be, these being added at an early stage to the fabrics (by simple printing or when weaving) so that end finishing operations or sewn seams are no longer required.

Figure 3:
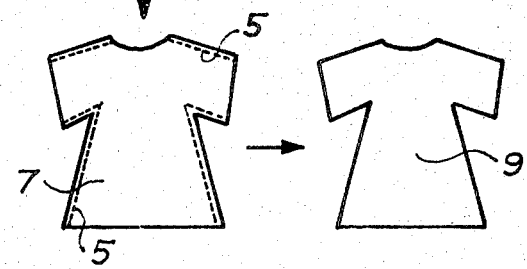
FIGS. 3 and 4 are two examples of doll dresses that can be obtained by the method of the invention.
Figure 3:
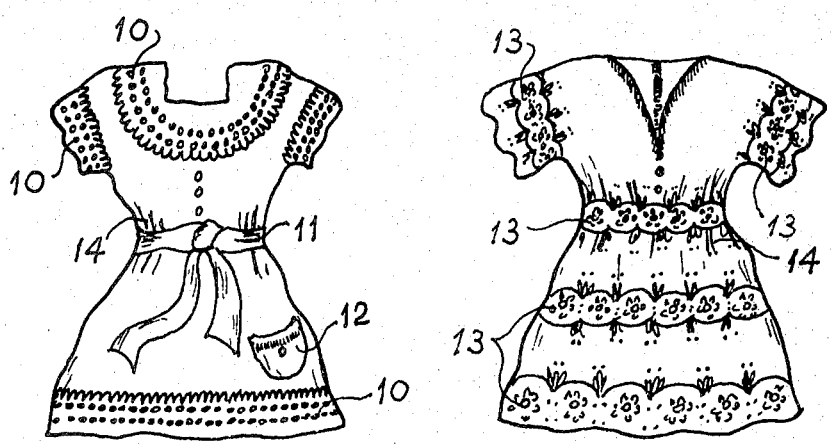
Figure 4:
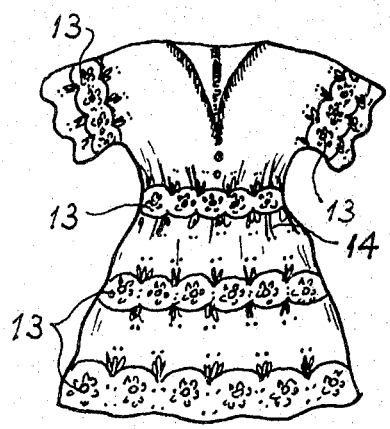

It is therefore possible to obtain, for instance, such a doll dress as shown in FIG. 3, where the garment is provided with trimming 10 at the neck and at the bottom of the skirt, and with belt 11 and pocket 12, or as shown in FIG. 4, with other kinds of trimming or ornamental patterns 13. Moreover, false pleats, as indicated in 14 can also be printed in order to simulate, for instance, more cloth fullness. And, of course, the most various styles or fashions of dresses can be obtained, with each clothing requisite (including buttons) properly figured thereon, by achieving a considerable economy as compared to the conventional methods, due to both the minimized labour involved and the saving of materials (with respect to the known methods which require additional portions of fabric in order to form the various clothing requisites such as collars, pockets and the like).

Thus, it can be seen that already full finished doll dresses, wholly comparable in appearance to quality dresses made by conventional methods utilizing sewing machines, are economically and readily obtainable by the method according to the invention.

Moreover, a number of welding and cutting apparatuses can be provided, which are each supplied with respective strips of fabric and which operate in a wholly automatic manner, so that a single operator is able to control several production lines, with obviously a considerable saving of labor.

The invention is not restricted to the above described embodiment thereof but it comprises many modifications and variations all of which are included within the scope of the invention.

What I claim is:

1. A method of making dresses for dolls or the like, said method comprising the steps of:

superposing to each other two strips of synthetic fabric; repeatedly performing thereafter, all along said fabric strips, electronic welding or the like in the form of dotted or dashed weld lines in order to join together said strips in proximity of the boundaries of each individual doll dress which is to be made so that sewn seams are simulated; cutting the welded garments all along their boundary line leaving a slight margin outside the weld line to simulate the margin of a sewn seam; and, finally, turning each single dress inside out.

2. The method according to claim 1, wherein said fabric strips, before being put together, are prepared by printing on their surfaces figured designs, tracings, wordings, or the like, pertaining to various clothing portions such as collars, belts, pockets, trimmings, cuffs, pleat patterns, or other similar finishing features.

3. The method according to claim 1, wherein the welding and cutting operations are made simultaneously.

4. The method according to claim 1, wherein the cutting step takes place following the welding step.

5. The method according to any one of claims 1, 3 and 4, wherein said superposed strips of fabric are moved in increments of one dress and the welding and cutting steps are performed each time said fabric strips stop.

6. The method according to claim 1, wherein said fabric strips, before being put together, are prepared by weaving directly therein, for instance by a Jacquard loom, figured designs, tracings, wordings or the like, simulating various clothing portions such as collars, belts, pockets, trimming, cuffs, pleat patterns, or other similar finishing features.

7. A dress for a doll or the like, said dress being defined by boundaries, said dress comprising two superposed portions of synthetic fabric, electronic weld lines joining said portions together located in closely spaced relation to said boundaries of said dress to simulate sewn seams, and said two portions of fabric having figures, designs, trimmings or the like, which define clothing portions such as collars, belts, pockets and the like, directly woven in said portions of said fabric, for instance, by a Jacquard system.

* * * * *